United States Patent
Lee et al.

(10) Patent No.: US 10,908,276 B2
(45) Date of Patent: Feb. 2, 2021

(54) METHOD AND DEVICE TO DETECT OBJECT

(71) Applicant: Samsung Electronics Co., Ltd., Suwon-si (KR)

(72) Inventors: Jaesup Lee, Yongin-si (KR); SungDo Choi, Suwon-si (KR); Tsuyoshi Sugiura, Yokohama (JP); DongHan Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 15/992,322

(22) Filed: May 30, 2018

(65) Prior Publication Data

US 2019/0196008 A1   Jun. 27, 2019

(30) Foreign Application Priority Data

Dec. 22, 2017 (KR) .......................... 10-2017-0178612

(51) Int. Cl.
| | | |
|---|---|---|
| *G01S 13/95* | (2006.01) | |
| *G01S 13/931* | (2020.01) | |
| *G01S 7/40* | (2006.01) | |
| *G01S 13/04* | (2006.01) | |
| *G01S 7/35* | (2006.01) | |
| *G01S 7/41* | (2006.01) | |
| *G01S 13/87* | (2006.01) | |

(52) U.S. Cl.
CPC ............. *G01S 13/95* (2013.01); *G01S 7/354* (2013.01); *G01S 7/4026* (2013.01); *G01S 7/411* (2013.01); *G01S 13/04* (2013.01); *G01S 13/87* (2013.01); *G01S 13/931* (2013.01); *G01S 13/956* (2013.01)

(58) Field of Classification Search
CPC .......... G01S 13/95; G01S 7/411; G01S 13/87; G01S 13/956; G01S 13/931; G01S 7/4026; G01S 13/04; G01S 7/354
USPC .......................................................... 342/26
See application file for complete search history.

(56) References Cited

U.S. PATENT DOCUMENTS

| | | | |
|---|---|---|---|
| 3,153,232 A * | 10/1964 | Fletcher ................ | G01S 13/933 342/29 |
| 5,486,865 A * | 1/1996 | James .................... | H04N 7/035 348/465 |
| 5,568,151 A | 10/1996 | Merritt | |
| 6,633,815 B1 | 10/2003 | Winter et al. | |
| 8,836,572 B2 | 9/2014 | Heilmann et al. | |

(Continued)

FOREIGN PATENT DOCUMENTS

| | | |
|---|---|---|
| JP | 2005-164492 A | 6/2005 |
| JP | 2007-3210 A | 1/2007 |

(Continued)

OTHER PUBLICATIONS

Partial European Search Report dated May 24, 2019 in counterpart European Patent Application No. 182139667 (14 pages in English).

*Primary Examiner* — Frank J McGue
(74) *Attorney, Agent, or Firm* — NSIP Law

(57) ABSTRACT

An object detection method and apparatus is disclosed, where the object detection method includes determining a weather condition based on a noise floor measured in an elevated direction, and detecting an object based on comparing a signal level of a target signal measured in a depressed direction and a threshold level corresponding to the determined weather condition.

26 Claims, 13 Drawing Sheets

(56) References Cited

U.S. PATENT DOCUMENTS

| | | | |
|---|---|---|---|
| 9,019,146 B1 | 4/2015 | Finley et al. | |
| 2005/0036130 A1 | 2/2005 | Arita et al. | |
| 2010/0309041 A1* | 12/2010 | Hassen | G01S 13/956 342/26 R |
| 2011/0298656 A1 | 12/2011 | Bechler | |
| 2014/0081507 A1 | 3/2014 | Urmson et al. | |

FOREIGN PATENT DOCUMENTS

| | | |
|---|---|---|
| JP | 2008-170323 A | 7/2008 |
| KR | 10-2008-0053996 A | 6/2008 |
| KR | 10-2010-0024746 A | 3/2010 |
| KR | 10-2016-0066854 A | 6/2016 |

\* cited by examiner

METHOD AND DEVICE TO DETECT OBJECT

CROSS-REFERENCE TO RELATED APPLICATIONS

This application claims the benefit under 35 USC § 119(a) of Korean Patent Application No. 10-2017-0178612 filed on Dec. 22, 2017, in the Korean Intellectual Property Office, the entire disclosure of which is incorporated herein by reference for all purposes.

BACKGROUND

1. Field

The following description relates to a method and apparatus for detecting an object.

2. Description of Related Art

Radar is used to detect an object and classify the object. Radar is also used to detect and analyze a movement of the object. Radar is provided in various platforms such as, for example, satellite and military purposes. Recently, radar is being provided in vehicles to analyze an image for the vehicle. An autonomous or automated driving vehicle needs to immediately detect an object and an environment in which the vehicle travels and respond to the detected object and environment. Accordingly, a radar provided mounted on the autonomous vehicle is being used.

When processing a radar image obtained from radar, increasing a resolution of the image may be needed. In particular, a fast response speed is needed for processing a radar image of radar provided in a mobile platform, and thus technology for increasing a resolution of the image, processing the image in real time, and adaptively controlling the radar based on an environment around the platform and an operation of the platform is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object detection method including determining a weather condition based on a noise floor measured by a first radar sensor from among radar sensors arranged separately from one another, in response to a reference signal emitted from a second radar sensor from among the radar sensors, and detecting an object based on comparing a threshold level corresponding to the determined weather condition and a signal level of a target signal measured by the first radar sensor.

The determining of the weather condition may include receiving, by the first radar sensor, the reference signal from an elevated direction, and emitting, by the second radar sensor, the reference signal towards the elevated direction, and the detecting of the object may include receiving, by the first radar sensor, the target signal from a depressed direction, and emitting, by the second radar sensor, the target signal towards the depressed direction.

The determining of the weather condition may include determining the weather condition to be an inclement condition, in response to the noise floor measured for the reference signal exceeding an inclement weather threshold.

The determining of the weather condition may include measuring a noise floor of an initial signal emitted from the second radar sensor in an initial condition, and determining, to be the inclement weather threshold, a value corresponding to the measured noise floor of the initial signal.

The determining of the weather condition may include measuring a signal level of the reference signal in a narrower detection region, in response to an obstacle being detected in an initial detection region formed by the first radar sensor and the second radar sensor, and determining the noise floor of the reference signal by subtracting the signal level of the reference signal measured in the narrower detection region from a signal level of the reference signal measured in the initial detection region.

The detecting of the object may include determining a noise floor measured in the inclement condition to be the threshold level, in response to the weather condition being determined to be an inclement condition, and determining that the object is present in a detection region formed by the first radar sensor and the second radar sensor, in response to the signal level of the target signal exceeding the threshold level.

The detecting of the object may include decreasing a beam width of the radar sensors, in response to the weather condition being determined to be an inclement condition.

The detecting of the object may include increasing an integration time of the radar sensors, in response to the weather condition being determined to be an inclement condition, and determining a noise floor measured during the integration time to be the threshold level.

The detecting of the object may include integrating, into a noise floor measured by the first radar sensor during the integration time, a noise floor measured by another radar sensor from among radar sensors during the integration time, in response to the weather condition being determined to be an inclement condition, and determining the integrated noise floor to be the threshold level.

The object detection method may include emitting, by the second radar sensor, a signal comprising a preset code, and receiving, by the first radar sensor, the signal comprising the preset code from the second radar sensor, and excluding signals from the other radar sensors.

The elevated direction may correspond to a direction forming a first angle with a ground surface and the depressed direction corresponds to a direction forming a second angle with the ground surface, and the first angle being greater than the second angle.

In another general aspect, there is provided an object detection apparatus including radar sensors arranged separately from one another and including a first radar sensor configured to receive a signal emitted from a second radar sensor, and a processor configured to determine a weather condition based on a noise floor measured by the first radar sensor, in response to a reference signal emitted from the second radar sensor, and to detect an object based on comparing a threshold level corresponding to the determined weather condition and a signal level of a target signal measured by the first radar sensor.

The first radar sensor may be configured to receive the reference signal from an elevated direction and to receive the target signal from a depressed direction, and the second radar sensor may be configured to emit the reference signal in the elevated direction and to emit the target signal in the depressed direction.

The processor may be configured to determine the weather condition to be an inclement condition, in response to the noise floor measured for the reference signal exceeding an inclement weather threshold.

The first radar sensor may be configured to measure a noise floor of an initial signal emitted from the second radar sensor in an initial condition, wherein the processor may be configured to determine a value corresponding to the noise floor of the initial signal to be the inclement weather threshold.

The first radar sensor may be configured to measure a signal level of the reference signal in a narrower detection region, in response to an obstacle being detected in an initial detection region formed by the first radar sensor and the other radar sensor, wherein the processor may be configured to determine the noise floor of the reference signal by subtracting the signal level of the reference signal measured in the narrower detection region from a signal level of the reference signal measured in the initial detection region.

The processor may be configured to determine a noise floor measured in the inclement condition to be the threshold level, in response to the weather condition being determined to be an inclement condition, wherein the processor may be configured to determine that the object is present in a detection region formed by the first radar sensor and the other radar sensor, in response to the signal level of the target signal exceeding the threshold level.

The radar sensors may be configured to decrease a beam width, in response to the weather condition being determined to be an inclement condition.

The processor may be configured to increase an integration time of the radar sensors and to determine a noise floor measured during the integration time to be the threshold level, in response to the weather condition being determined to be an inclement condition.

The processor may be configured to integrate, into a noise floor measured by the first radar sensor during an integration time, a noise floor measured by another radar sensor from among the radar sensors during the integration time, in response to the weather condition being determined to be an inclement condition, and to determine the integrated noise floor to be the threshold level.

The second radar sensor may be configured to emit a signal including a preset code, and the first radar sensor may be configured to receive the signal including the preset code from the second radar sensor and to exclude signals from the other radar sensors.

Each of the radar sensors may be configured to receive a reflected signal transmitted from a radar sensor from among the radar sensors, excluding the each radar sensor.

Each of the radar sensors may operate sequentially in one or more corresponding time slots, and the each radar sensors are deactivated in another time slot.

The processor may be configured to change the initial detection region to the narrower detection region based on any one or any combination of changing a beam direction of the reference signal, adjusting a beam width of the reference signal, or changing a beam pattern region.

In another general aspect, there is provided an apparatus for detecting an object of interest including radar sensors arranged at a distance one another, a first radar sensor of the radar sensors configured to receive a signal emitted from a second radar sensor of the radar sensors, a head-up display (HUD), a processor configured to determine a weather condition based on a noise floor measured by the first radar sensor, in response to a reference signal emitted from the second radar sensor in an elevated direction, detect an object based on comparing a threshold level corresponding to the determined weather condition and a signal level of a target signal measured by the first radar sensor, the target signal being emitted by the second radar sensor in a depressed direction, and output the object through the HUD.

Other features and aspects will be apparent from the following detailed description, the drawings, and the claims.

Figure 1:
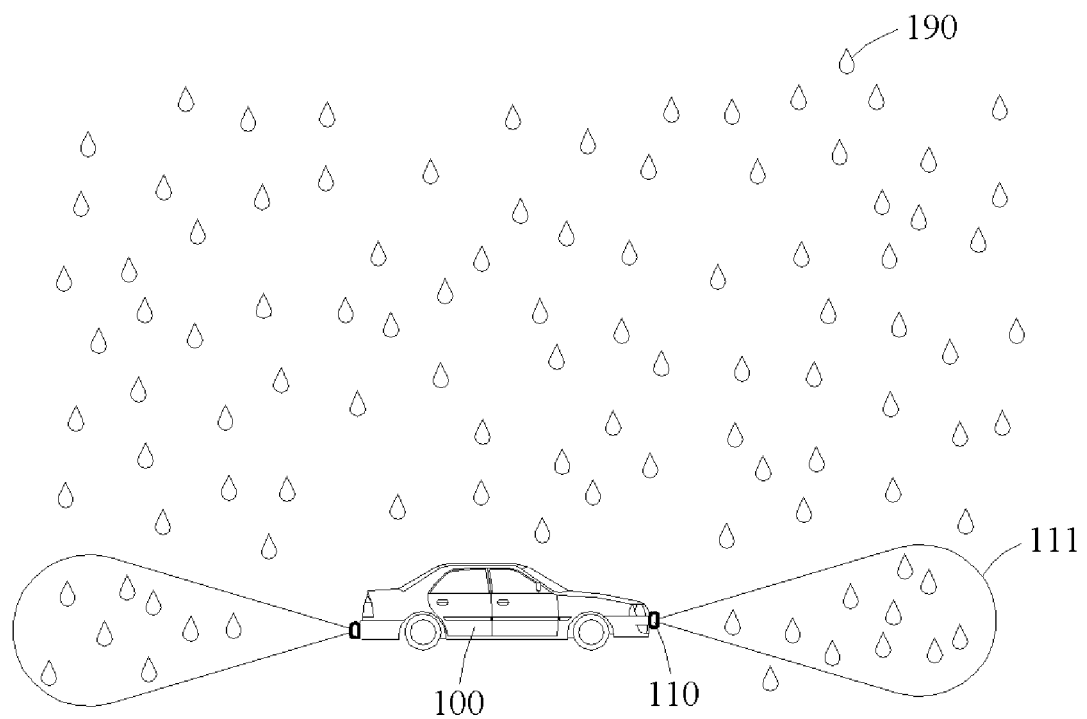
FIG. 1 is a diagram illustrating an example of a situation in which an object is detected in inclement weather.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Also, in the description of embodiments, detailed description of well-known related structures or functions will be omitted when it is deemed that such description will cause ambiguous interpretation of the present disclosure.

FIG. 1 is a diagram illustrating an example of a situation in which an object is detected in inclement weather.

Referring to FIG. 1, an object detection apparatus 100 detects an object through a radar sensor 110. The object detection apparatus 100 may be embodied by, for example, a vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone. In an example, the apparatus for detecting an object of interest is applicable to a robot requiring a positioning operation. The embodiments may also be used to interpret the visual information in a device including an intelligent system such as a head-up display (HUD) installed for driving assistance in a vehicle or a fully autonomous driving system to assist safe and comfortable driving.

In an example, the object detection apparatus 100 is incorporated in various types of mobile terminals such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, other consumer electronics/information technology (CE/IT) device, or any other device capable of wireless communication or network communication consistent with that disclosed herein. However, the mobile terminal is not limited to the examples described in the forgoing.

In an example, the object detection apparatus 100 may detect an object in front of the vehicle while traveling. The radar sensor 110 detects the object present in a detection region 111. Although the radar sensor 110 is illustrated as detecting an object in front or in rear of the vehicle in FIG. 1, the radar sensor 110 may detect the object in other directions, such as, for example, left side of the vehicle, without departing from the spirit and scope of the illustrative examples described.

The object detection apparatus 100 detects the object being around the object detection apparatus 100 through the radar sensor 110 in various weather conditions. A weather condition used herein refers to a condition indicating specific weather in which the object detection apparatus 100 is present. The weather condition may include conditions, such a, for example, a sunny or serene condition, an inclement condition, a rainy condition, a windy condition and a snowy condition.

Based on the weather condition, accuracy of the radar sensor 110 may be degraded. For example, in the inclement condition, accuracy of the radar sensor 110 may be degraded due to rain or snow. This is because a transmission signal emitted from the radar sensor 110 is scattered due to rain or snow particles, for example, a particle 190. When the transmission signal is scattered by the particle 190, a noise power received by each radar sensor, for example, the radar sensor 110, may increase. Thus, when a reflection signal reflected from the object is detected to be relatively smaller than noise occurring by the particle 190, the object detection apparatus 100 may not be able to detect the object. Herein, the particle 190 may also be referred to as a clutter.

In an example, the object detection apparatus 100 may enhance the accuracy of detecting an object by adjusting the radar sensor 110 based on the weather condition. For example, the object detection apparatus 100 may determine the weather condition based on a signal power measured by the radar sensor 110. In an example, the object detection apparatus 100 may detect the object based on a threshold level corresponding to the determined weather condition and a signal level measured by the radar sensor 110. Hereinafter, how a weather condition is determined and an object is detected based on the determined weather condition will be described in detail.

Figure 2:
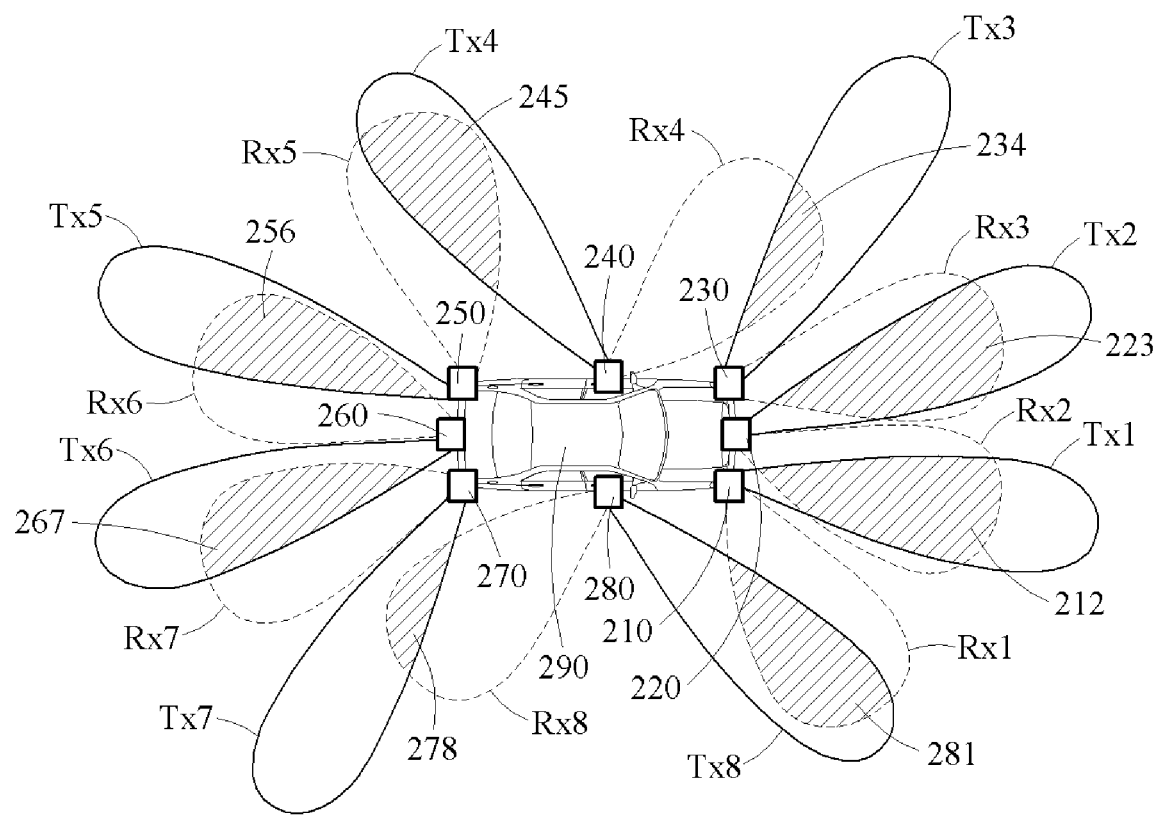
FIG. 2 is a diagram illustrating an example of an arrangement of radar sensors.

FIG. 2 is a diagram illustrating an example of an arrangement of radar sensors.

Referring to FIG. 2, an object detection apparatus 290 includes a plurality of radar sensors. In an example, the radar sensors are separate from one another, as illustrated. Each of the radar sensors may receive a reflection signal, which is a signal obtained when a transmission signal emitted from another radar sensor is reflected, and thus a spillover effect may be minimized.

The spillover effect used herein refers to a phenomenon in which a radar sensor directly receives a signal emitted by itself. The radar sensor may include a transmitting antenna (Tx antenna) and a receiving antenna (Rx antenna) in a module of a limited size. Although the Tx antenna emits a transmission signal outside, a portion of the transmission signal may be emitted directly to the Rx antenna. A direct coupling between the Tx antenna and the Rx antenna in the same radar sensor may enable the radar sensor to measure its own signal, instead of a signal reflected from an object. Such a spillover effect may degrade accuracy of the radar sensor.

The object detection apparatus 290 may include, for example, eight radar sensors 210 through 280 as illustrated in FIG. 2. The radar sensors 210 through 280 may be arranged along an outline as illustrated. However, the number and arrangement of radar sensors is not limited to the illustrated example, and other numbers and arrangements of radar sensors may be used without departing from the spirit and scope of the illustrative examples described.

In an example, as illustrated, the object detection apparatus 290 detects an object present in detection regions 212, 223, 234, 245, 256, 267, 278, and 281. Herein, a transmission beam pattern region may indicate an area where a beam emitted by a radar sensor has a valid signal power, and a reception beam pattern region may indicate an area where the radar sensor receives an external signal.

For example, as illustrated in FIG. 2, a second radar sensor 220 receives a first reflection signal. In an example, the first reflection signal is a signal reflected by an object, a particle, or the like from a first transmission signal that is emitted from a first radar sensor 210. In this example, the first radar sensor 210 and the second radar sensor 220 are arranged separately from each other, and thus it is less likely that a Tx antenna of the first radar sensor 210 and an Rx antenna of the second radar sensor 220 are directly coupled. In addition, the second radar sensor 220 detects whether an object is present in a first detection region 212, where the first detection region 212 is an overlapping region between a second reception beam pattern region (Rx2) of the second radar sensor 220 and a first transmission beam pattern region (Tx1) of the first radar sensor 210.

Similarly to the second radar sensor 220, remaining radar sensors 210 and 230 through 280 may also measure a reflection signal reflected from a transmission signal emitted from other radar sensors among the radar sensors 210 through 280. In an example, a radar sensor emits a target transmission signal, and at least one radar sensor receives a target reflection signal to measure a signal power. In an example, the radar sensor also measures an amplitude and a phase of the signal power.

For example, as illustrated, a third radar sensor 230 measures a signal emitted from the second radar sensor 220, and a fourth radar sensor 240 measures a signal emitted from the third radar sensor 230. A fifth radar sensor 250 measures a signal emitted from the fourth radar sensor 240, and a sixth radar sensor 260 measures a signal emitted from the fifth radar sensor 250. A seventh radar sensor 270 measures a signal emitted from the sixth radar sensor 260, and an eighth radar sensor 280 measures a signal emitted from the seventh radar sensor 270. Similarly, the first radar sensor 210 measures a signal emitted from the eighth radar sensor 280.

A second detection region 223 is an overlapping region between a third reception beam pattern region (Rx3) and a second transmission beam pattern region (Tx2). A third detection region 234 is an overlapping region between a fourth reception beam pattern region (Rx4) and a third transmission beam pattern region (Tx3). A fourth detection region 245 is an overlapping region between a fifth reception beam pattern region (Rx5) and a fourth transmission beam pattern region (Tx4). A fifth detection region 256 is an overlapping region between a sixth reception beam pattern region (Rx6) and a fifth transmission beam pattern region (Tx5). A sixth detection region 267 is an overlapping region between a seventh reception beam pattern region (Rx7) and a sixth transmission beam pattern region (Tx6). A seventh detection region 278 is an overlapping region between an eighth reception beam pattern region (Rx8) and a seventh transmission beam pattern region (Tx7). An eighth detection region 281 is an overlapping region between Rx1 and an eighth transmission beam pattern region (Tx8).

In an example, the object detection apparatus 290 operates the radar sensors 210 through 280 in sequential order to form a detection region of each radar sensor. For example, the first radar sensor 210 emits the first transmission signal in a first timeslot, and the second radar sensor 220 receives the first reflection signal during the first timeslot. The first radar sensor 210 is inactivated in a second timeslot after the first timeslot. The second radar sensor 220 emits a second transmission signal in the second timeslot, and the third radar sensor 230 receives a second reflection signal during the second timeslot. Other remaining radar sensors among the radar sensors 210 through 280 may operate similarly to the foregoing in sequential order.

In an example, each of the radar sensors 210 through 280 included in the object detection apparatus 290 identifies a radar sensor that is to emit and receive a signal to and from each other based on a preset code. For example, a radar sensor may emit a signal including a preset code, and at least one radar sensor may receive the signal including the preset code from the radar sensor and exclude other signals. Each radar sensor may emit a signal including a code discriminative for each radar sensor. For example, as illustrated, the first radar sensor 210 emits the first transmission signal including a first code, and the second radar sensor 220 receives the first reflection signal including the first code. Each of other remaining radar sensors among the radar sensors 210 through 280 may also receive a signal including a code allocated to a corresponding radar sensor and exclude other signals.

For convenience of explanation, it has been described that a signal emitted from a single radar sensor is received by another radar sensor, but examples are not limited to the illustrated example. In an example, a signal emitted from a single radar sensor may be received by a plurality of radar sensors. For example, in a case in which the second radar sensor 220 emits the second transmission signal, the first radar sensor 210 and the third radar sensor 230 that are arranged around the second radar sensor 220 may receive the second reflection signal.

The illustrated arrangement of the radar sensors, and the signal transmitting and receiving method described in the foregoing may be used to minimize a spillover effect.

Figure 3:
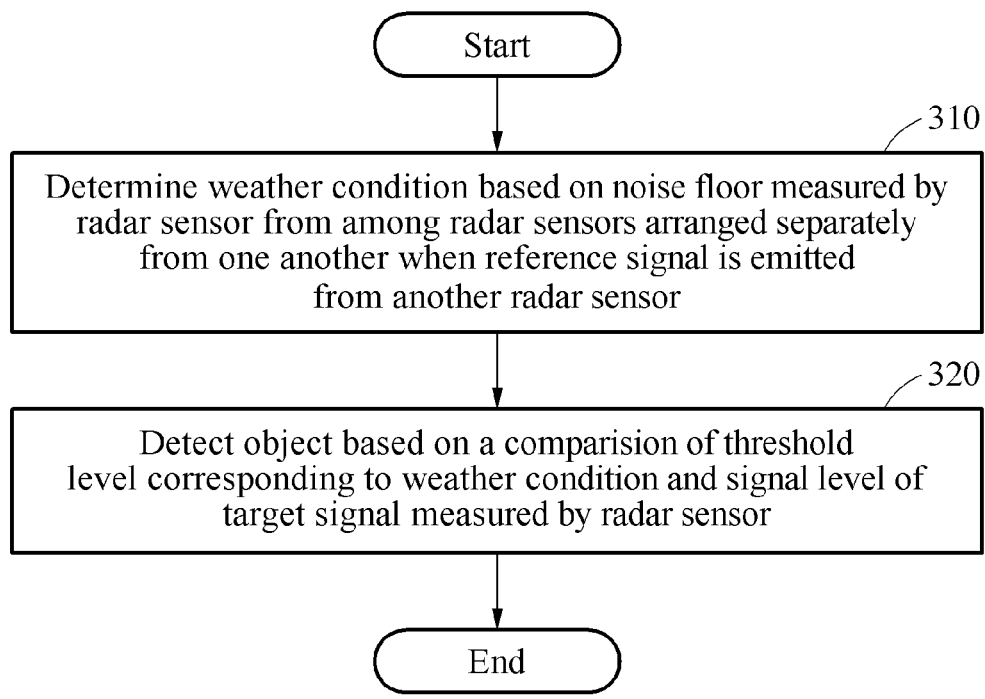
FIG. 3 is a diagram illustrating an example of an object detection method.

FIG. 3 is a diagram illustrating an example of an object detection method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG.

3 below, the descriptions of FIGS. 1-2 are also applicable to FIG. 3, and are incorporated herein by reference. Thus, the above description may not be repeated here.

Referring to FIG. 3, in operation 310, an object detection apparatus determines a weather condition based on a noise floor measured by at least one radar sensor from among a plurality of radar sensors arranged separately from one another when a reference signal is emitted from another radar sensor.

A noise floor used herein refers to a measured signal value of a signal generated from a sum of remaining signals other than a signal reflected from an object among signals measured by each of the radar sensors. For example, the noise floor may be a value obtained by measuring, by each of the radar sensors, a signal reflected by a particle around the object detection apparatus.

A reference signal used herein refers to a signal used to determine a weather condition by a radar sensor. For example, a signal that is emitted externally by a radar sensor to determine a weather condition may be referred to as a reference transmission signal. The reference transmission signal emitted by the radar sensor may be reflected by a particle and the like, and the reflected reference transmission signal may be measured by another radar sensor. The reflected reference transmission signal may also be referred to as a reference reflection signal.

The process of determining the weather condition will be further described with reference to FIGS. 4 through 7 below.

In operation 320, the object detection apparatus detects the object based on comparing a threshold level corresponding to the determined weather condition and a signal level of a target signal measured by the radar sensor.

A signal level used herein may also be a signal power, for example. A unit of the signal power may be microwatt (μW), but is not limited thereto, and decibel-milliwatts (dBm) may also be used as the unit. A threshold level used herein refers to a level that is the basis to detect an object. For example, the threshold level may be a noise floor measured while a certain weather condition persists. Thus, the object detection apparatus may dynamically determine a threshold level in each weather condition.

A target signal used herein refers to a signal used by a radar sensor to detect an object. For example, a signal emitted externally from a radar sensor to detect an object may be referred to as a target transmission signal, and the target transmission signal emitted by the radar sensor may be reflected by the object, a particle, and the like. The reflected target transmission signal may be measured by another radar sensor. The reflected target transmission signal may also be referred to as a target reflection signal. When the signal level of the target signal is greater than the threshold level may indicate the presence of the object.

Enhanced object detection will be further described with reference to FIGS. 8 through 10.

Figure 4:
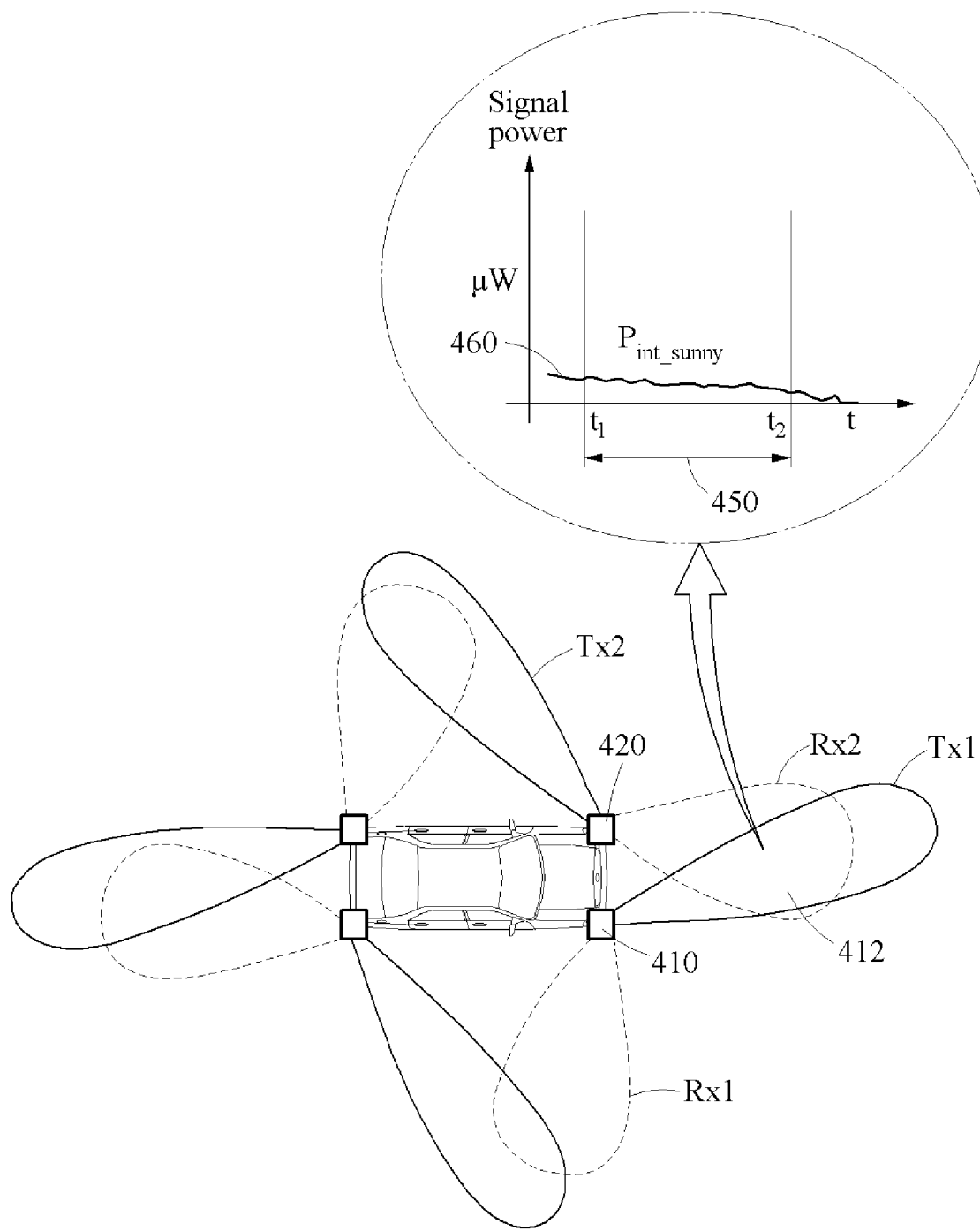
FIG. 4 is a diagram illustrating an example of how an object detection apparatus determines an inclement weather threshold in an initial condition.

FIG. 4 is a diagram illustrating an example of how an object detection apparatus determines an inclement weather threshold in an initial condition. For convenience of description, an object detection apparatus illustrated in FIG. 4 includes four radar sensors. However, other numbers and arrangements of radar sensors may be used without departing from the spirit and scope of the illustrated example.

As described above with reference to FIG. 3, a first radar sensor 410 and a second radar sensor 420 form a detection region 412. The detection region 412 is an overlapping region between a first transmission beam pattern region (Tx1) of the first radar sensor 410 and a second reception beam pattern region (Rx2) of the second radar sensor 420.

For example, the first radar sensor 410 emits a transmission signal, and the second radar sensor 420 receives a reflection signal, which is a reflected transmission signal.

The object detection apparatus measures a signal power 460 in the detection region 412. For example, a radar sensor of the object detection apparatus measures a voltage level of a signal. In an example, a radar sensor of the object detection apparatus may measure a noise floor of an initial signal emitted from another radar sensor in an initial condition. For example, the noise floor may be obtained in a form of a noise power level, for example, a value corresponding to a square of the voltage level. The initial signal refers to a signal used to determine an inclement weather threshold, i.e., a threshold used to classify a weather condition into various conditions. For example, the initial condition may be a sunny condition, and the object detection apparatus may measure the noise floor of the initial signal in the sunny condition.

A processor of the object detection apparatus may determine a value corresponding to the noise floor of the initial signal to be the inclement weather threshold. For example, as illustrated, the object detection apparatus may determine the inclement weather threshold based on a noise floor measured during an integration time 450 in the initial condition. For example, the object detection apparatus may determine, to be the inclement weather threshold, a statistical value of the noise floor measured during the integration time 450, for example, a mean square value. For another example, the object detection apparatus may determine, to be the inclement weather threshold, a value $P_{int\_sunny}$ obtained through a mathematical integration of noise floors collected during the integration time 450. A noise floor used herein refers to a value having an amplitude and a phase, and a phase of the noise floor may have a value between −1 and 1. In an example, when the integration is performed on noise floors during an infinite time interval, a value obtained through the integration may converge to 0. However, a time interval is limited to the integration time 450, and thus the noise floor obtained through the integration may have an amplitude. The integration time 450 indicates a time interval from $t_1$ to $t_2$ in the example illustrated in FIG. 4. However, an integration time is not limited to the example, and may change based on a design.

The inclement weather threshold is a reference threshold used to classify the weather condition into various conditions. For example, when a noise floor of the reference signal exceeds the inclement weather threshold, a current weather condition may be an inclement condition. In another example, when the noise floor of the reference signal is less than or equal to the inclement weather threshold, the current weather condition may be a sunny condition. However, examples are not limited to the example described in the foregoing, and a plurality of inclement weather thresholds may be used. For example, a plurality of weather conditions may be classified by a first through a k-th inclement weather threshold based on a particle distribution corresponding to each of the weather conditions. Herein, k denotes an integer greater than or equal to 1. The first inclement weather threshold may indicate a sparse particle distribution, and the k-th inclement weather threshold may indicate a denser particle distribution. Thus, the object detection apparatus may determine an inclement condition among plural inclement conditions based on such a noise floor. For example, the object detection apparatus may determine the weather condition based on precipitation, for example, an amount of rainfall or snowfall.

Figure 5:
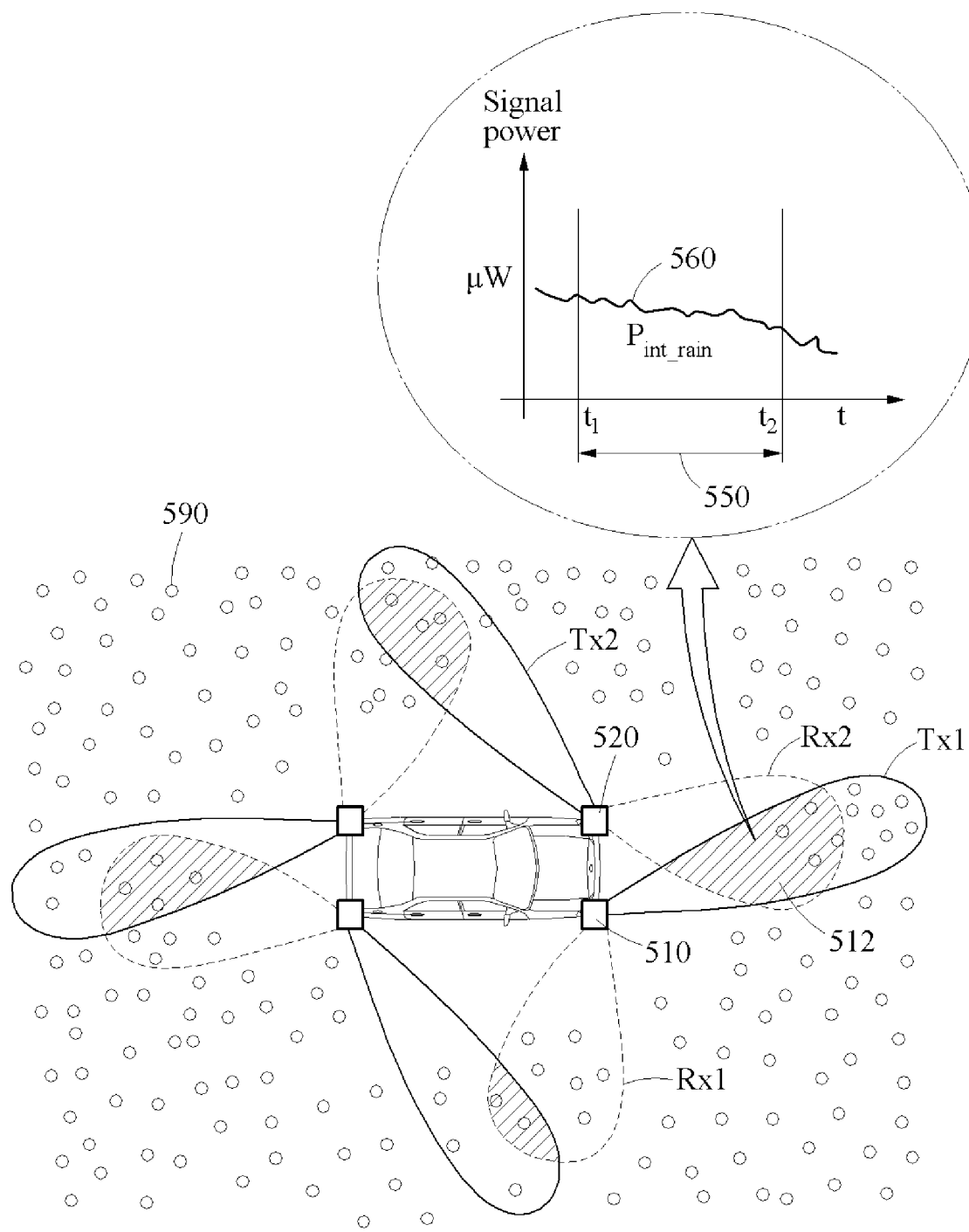
FIG. 5 is a diagram illustrating an example of how an object detection apparatus determines a weather condition.

FIG. 5 is a diagram illustrating an example of determining a weather condition using an object detection apparatus.

Referring to FIG. 5, a particle 590 may be present around an object in an inclement condition as described above. The particle 590 in, for example, rain and snow, may reflect a signal of a radar sensor, and a noise floor measured by the radar sensor may thus increase.

When a noise floor measured for a reference signal exceeds an inclement weather threshold, an object detection apparatus determines a weather condition to be an inclement condition. For example, a first radar sensor 510 emits the reference signal, and a second radar sensor 520 receives a reflected reference signal to measure a signal power 560. A detection region 512 is an overlapping region between a first transmission beam pattern region (Tx1) and a second reception beam pattern region (Rx2). As indicated by the noise floor of the reference signal, the signal power 560 may be measured to a relatively greater extent than a noise floor of an initial signal shown in FIG. 5. For example, the object detection apparatus may determine the weather condition by comparing, to the inclement weather threshold, a value $P_{int\_rain}$ obtained through a mathematical integration on the noise floor of the reference signal measured during an integration time 550.

Figure 6:
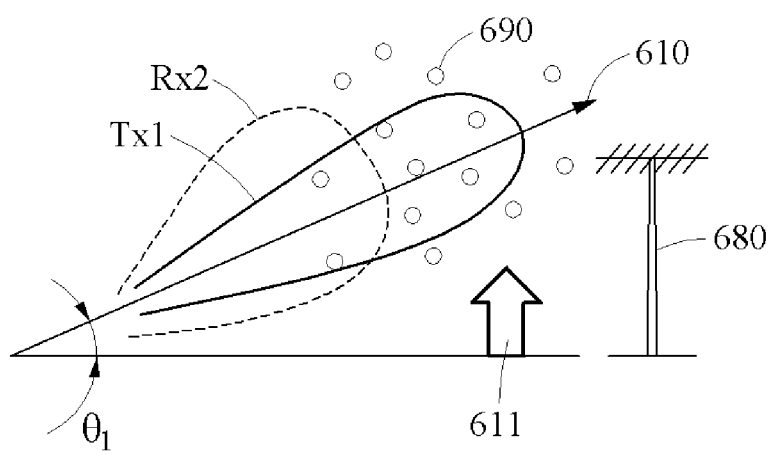
FIG. 6 is a diagram illustrating an example of how an object detection apparatus adjusts a beam direction of a radar sensor to determine a weather condition.

FIG. 6 is a diagram illustrating an example of how an object detection apparatus adjusts a beam direction of a radar sensor to determine a weather condition.

In an example, an object detection apparatus may adjust a beam direction to determine a weather condition. Referring to FIG. 6, at least one radar sensor of the object detection apparatus receives a reference signal from an elevated direction 610, and another radar sensor of the object detection apparatus emits the reference signal in the elevated direction 610. In this example, when a beam direction is elevated, a probability of an obstacle 680 being present may decrease, and accuracy in determining a weather condition is enhanced.

For example, the object detection apparatus elevates a beam direction of each radar sensor as illustrated by 611. The elevated direction 610 indicates a direction forming a preset elevation angle $\theta_1$ with a ground surface. The object detection apparatus forms a first transmission beam pattern region (Tx1) and a second reception beam pattern region (Rx2) based on the ascending direction 610. A detection region may be formed along the ascending direction 610.

The object detection apparatus determines a weather condition based on a noise floor collected in the detection region formed along the elevated direction 610. Thus, the object detection apparatus measures a noise floor solely due to the influence of the particle 690 without being disturbance of the obstacle 680.

As described with reference to FIGS. 4 and 5, the object detection apparatus may elevate a beam direction of radar sensors to an elevated direction to determine a weather condition.

Figure 7:
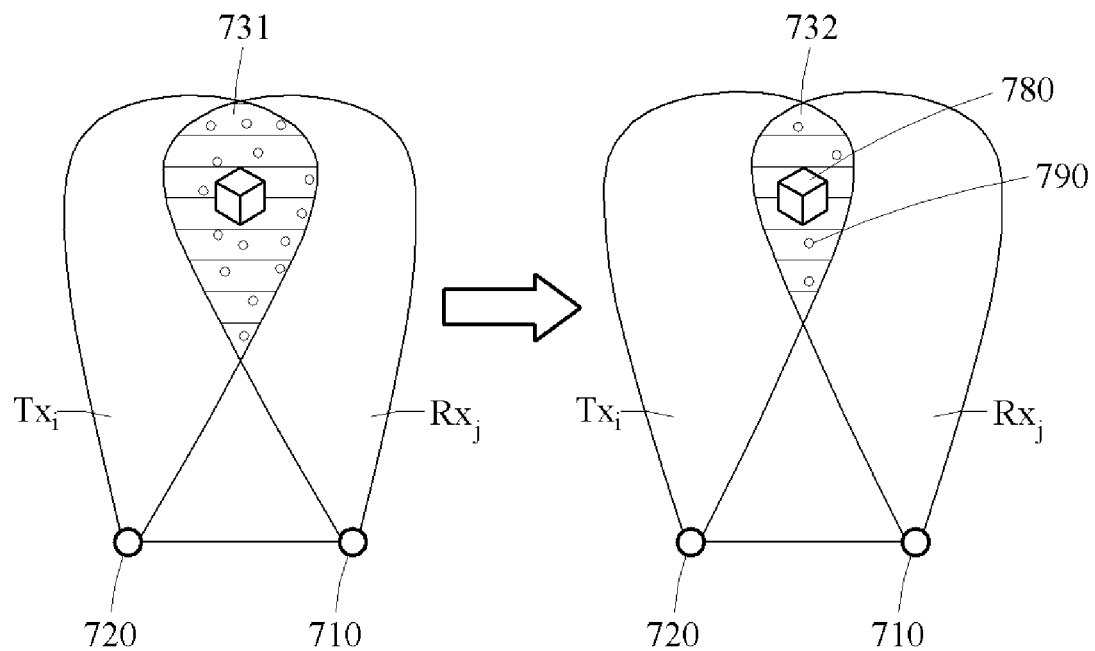
FIG. 7 is a diagram illustrating an example of how an object detection apparatus adjusts a detection region to be formed by radar sensors to determine a weather condition.

FIG. 7 is a diagram illustrating an example of how an object detection apparatus adjusts a detection region formed by a plurality of radar sensors to determine a weather condition.

Referring to FIG. 7, an object detection apparatus minimizes an influence of an obstacle 780 by adjusting a detection region. In the example illustrated in FIG. 7, a 3 decibel (dB) beam width and angle of a transmission beam and a reception beam is given, and a waveform of each beam is also given.

For example, as illustrated, a radar sensor 710 and another radar sensor 720 form an initial detection region 731. The initial detection region 731 is an overlapping region between a j-th reception beam pattern region ($Rx_j$) formed by the radar sensor 710, or a j-th radar sensor, and an i-th transmission beam pattern region ($Tx_i$) formed by the other radar sensor 720, or an i-th radar sensor. Herein, subscripts i and j denote integers different from each other. In this example, a signal power $P_{i,r}$ measured by the object detection apparatus in the initial detection region 731 includes a signal power $P_r^o$ reflected from the obstacle 780 and a signal power $P_{i,r}^c$ reflected by an ambient particle 790. The signal power $P_{i,r}^c$ reflected by the particle 790 is proportional to a size of a detection region. For example, the signal power $P_{i,r}^c$ may be represented by a value obtained by $"P_r^c \times$a size of an initial detection region, for example, $P_{i,r}^c = "P_r^c \times$a size of an initial detection region, where $"P_r^c$ denotes a signal power reflected by a particle per unit area.

In an example, when an obstacle is detected in an initial detection region, the object detection apparatus may adjust a size of a detection region. For example, when the obstacle 780 is detected, the object detection apparatus changes the initial detection region 731 to a narrow detection region 732. The narrow detection region 732 indicates a region, whose size is reduced from the initial detection region 731 based on the obstacle 780. In an example, the object detection apparatus changes the initial detection region 731 to the narrow detection region 732 by any one or any combination of changing a beam direction, adjusting a beam width, or changing a beam pattern region. In such an example, the object detection apparatus may track a position of the obstacle 780 to change a detection region based on the obstacle 780.

In addition, when the obstacle 780 is detected in the initial detection region 731 formed by the radar sensor 710 and the other radar sensor 720, the object detection apparatus measures a signal level of a reference signal in the narrow detection region 732. A signal power $P_{n,r}^c$ corresponding to the signal level measured in the narrow detection region 732 may be indicated by the signal power $P_r^o$ reflected mainly by the obstacle 780.

A processor of the object detection apparatus determines a noise floor of the reference signal by subtracting, from a signal level of the reference signal measured in the initial detection region 731, the signal level of the reference signal measured in the narrow detection region 732. The object detection apparatus may thus exclude a signal reflected by the obstacle 780 from the reference signal measured in the initial detection region 731. The object detection apparatus measures a noise floor of a reference reflection signal from which the signal power $P_r^o$ reflected by the obstacle 780 is excluded. The object detection apparatus then determines a weather condition based on a result of comparing the noise floor and an inclement weather threshold.

Thus, the object detection apparatus may determine a noise floor reflected by the particle 790 by minimizing an influence of the obstacle 780, thereby determining the weather condition more accurately.

In addition, the object detection apparatus may determine a minimal detection region by tracking a change in received signal power based on a change in size of a detection region. For example, the signal power reflected by the particle 790 may be proportional to a size of a detection region. Herein, when a variation greater than a variation of a received signal corresponding to the change in size of the detection region is detected, the object detection apparatus may determine the minimal detection region.

Figure 8:
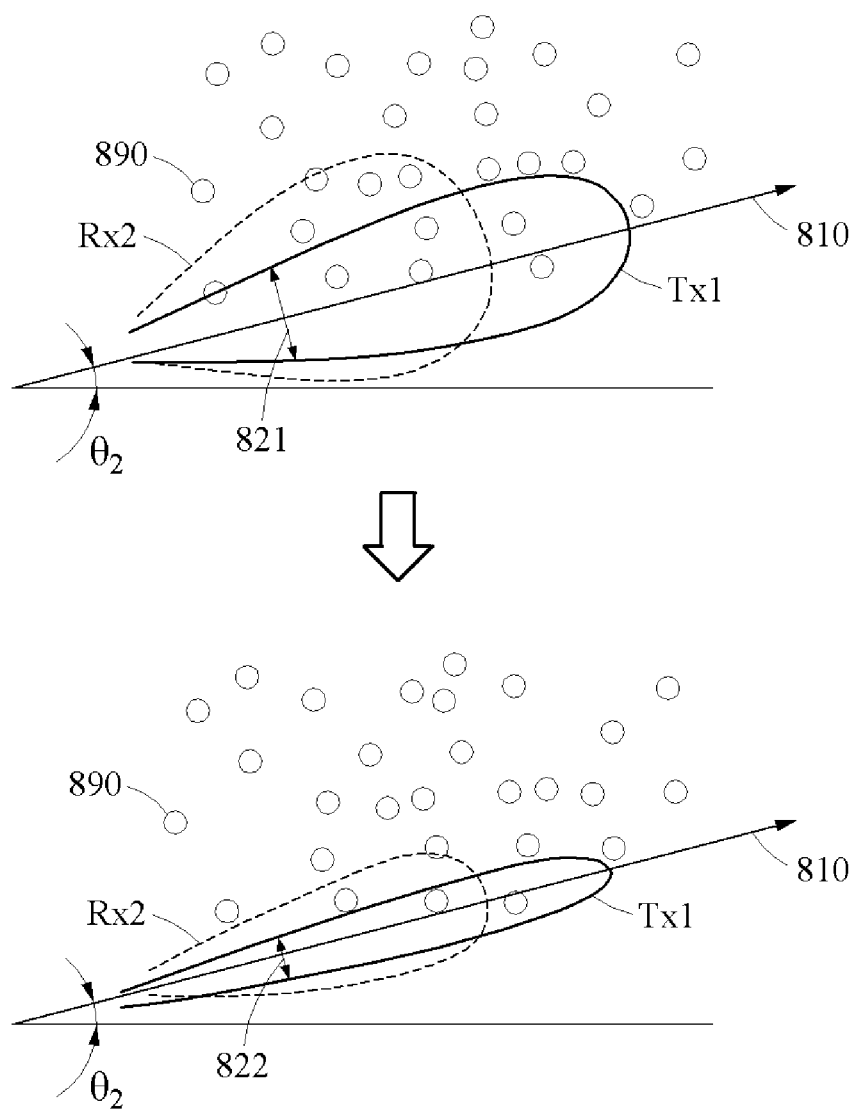
FIG. 8 is a diagram illustrating an example of how an object detection apparatus adjusts a beam direction and a beam width of a radar sensor.

FIG. 8 is a diagram illustrating an example of how an object detection apparatus adjusts a beam direction and a beam width of a radar sensor.

In an example, an object detection apparatus may lower a beam direction of a radar sensor to detect an object. Referring to FIG. 8, the object detection apparatus adjusts a previous beam direction, which is an upwards direction, of a radar sensor, to a direction 810 pointing lower. The lower direction 810 indicates a direction that forms, with a ground surface, an angle $\theta_2$ that is less than an elevation angle of the upwards direction.

For example, at least one radar sensor of the object detection apparatus may receive a target signal from the lower direction 810, and another radar sensor of the object detection apparatus may emit the target signal in the lower direction 810.

In this example, when a weather condition is determined to be an inclement condition, the object detection apparatus may decrease a beam width of each radar sensor. For example, as illustrated, the object detection apparatus decreases the beam width of the radar sensors from a first width 821 to a second width 822. Accordingly, an overlapping region between a first transmission beam pattern region (Tx1) and a second reception beam pattern region (Rx2) may be narrowed. The narrower a beam width, the stronger a directivity of a signal, and thus an influence of a particle 890 may be minimized.

In addition, when the weather condition is determined to be the inclement condition, the object detection apparatus may adjust the beam width of the radar sensors to a beam width corresponding to an inclement weather level of the inclement condition. The inclement weather level may be set based on, for example, a size of a particle or a speed of the particle. For example, a higher inclement weather level may be set for a larger size of a particle or a higher speed of the particle. When the inclement weather level is higher, the beam width may be adjusted to be narrower.

Figure 9:
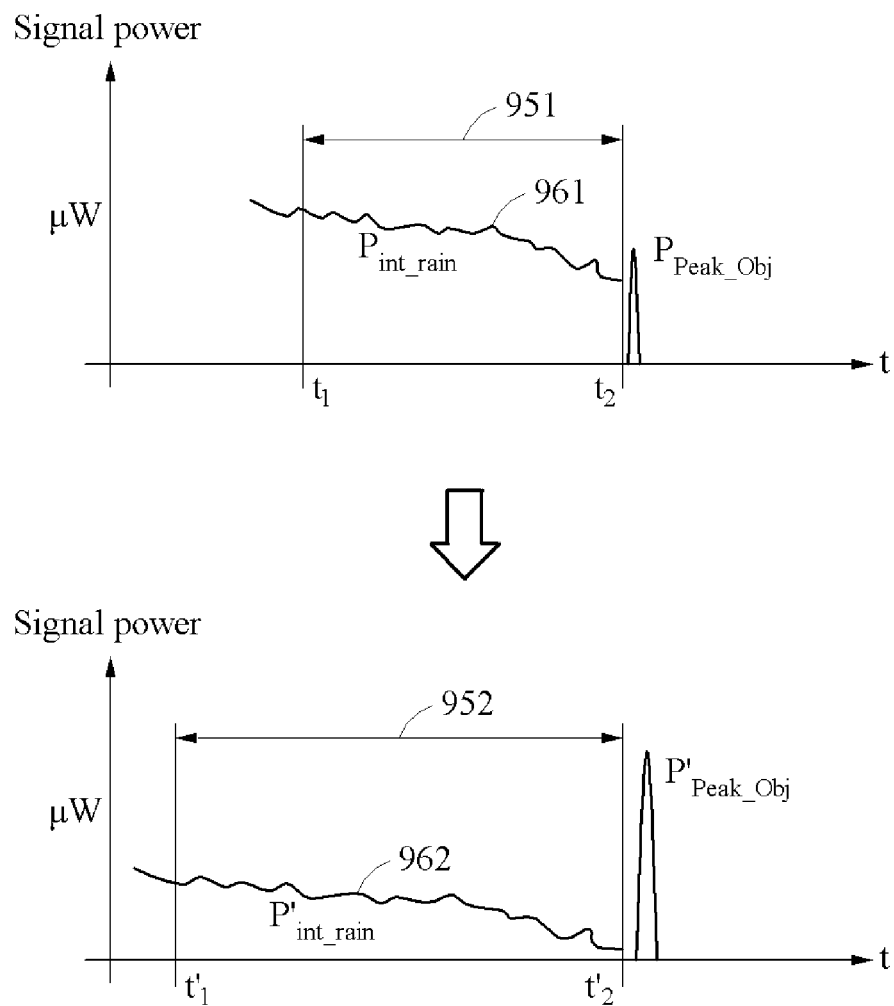
FIG. 9 is a diagram illustrating an example of how an object detection apparatus adjusts an integration time of a radar sensor.

FIG. 9 is a diagram illustrating an example of how an object detection apparatus adjusts an integration time of a radar sensor.

In an example, when a weather condition is determined to be inclement, an object detection apparatus may determine a noise floor measured in the inclement condition to be a threshold level. For example, as illustrated in FIG. 9, the object detection apparatus determines, to be the threshold level, a noise floor measured at a time when an object signal $P_{Peak\_Obj}$ is detected. For another example, as illustrated in FIG. 9, the object detection apparatus determines, to be the threshold level, a value $P_{int\_rain}$, obtained through a mathematical integration performed on a noise floor measured during an integration time 951 corresponding to the point in time at which the object signal $P_{Peak\_Obj}$ is detected. In an example, the object detection apparatus determines a threshold level corresponding to a noise floor based on an inclement condition, and thus, dynamically changes the threshold level in response to an instantaneous change in weather condition. The object detection apparatus may thus maintain a relatively high accuracy in detecting an object despite a change in weather.

For example, as illustrated, t2 indicates the point in time at which the object signal $P_{Peak\_Obj}$ is detected, and the integration time 951 indicates an interval from $t_2$ at which the object signal $P_{Peak\_Obj}$ is detected to a point in time before a first time length. In the example illustrated in FIG. 9, the integration time 951 is indicated by an interval between $t_1$ and $t_2$.

When a signal level of a target signal 961 exceeds the threshold level, a processor of the object detection apparatus may determine that an object is present in a detection region formed by at least one radar sensor and another radar sensor.

In an example, when performing object detection, the object detection apparatus may randomize a noise floor by adjusting the integration time 951. For example, the object detection apparatus may randomize a voltage level of a signal measured by a radar sensor, by increasing the integration time 951. A noise floor integrated from a noise power level corresponding to the randomized voltage level may decrease in amplitude, and an object signal $P'_{Peak\_Obj}$, which is a deterministic signal, may be explicitly detected. In addition, a signal power of the object signal $P'_{Peak\_Obj}$ may be improved.

In an example, the object detection apparatus may increase an integration time to an integration time 952 of radar sensors when a weather condition is determined to be an inclement condition. For example, as illustrated in FIG. 9, the object detection apparatus determines an interval from a point t'2 in time at which the object signal $P'_{Peak\_Obj}$ is detected to a point in time before a second time length to be the integration time 952. Herein, V, indicates a start point of the increased integration time 952. In addition, when it is determined that the weather condition is one of inclement conditions, the object detection apparatus determines a time length set for the one inclement condition to be the integration time 952. For example, when an inclement weather level of an inclement condition increases, a time length of the integration time 952 that is set for the inclement condition may also increase.

When the integration time 952 increases, a value $P'_{int\_rain}$ obtained through a mathematical integration on a noise floor may decrease because the noise floor is induced by a particle. In addition, when the integration time 952 increases, an irregular value may gradually converge. This is because a probability of a particle, for example, a particle of rain or snow, being present in a detection region of a radar sensor may be represented as a probability model with a mean value 0. Thus, when the integration time 952 is infinite, the value $P'_{int\_rain}$ obtained through the integration of the noise floor may converge on 0.

For example, when the weather condition is determined to be a rainy condition, a particle may be a raindrop. In this example, it is assumed that a size of the raindrop is less than or equal to 5 millimeters (mm), and a speed of the raindrop is 10 meters per second (m/s). To establish a probability model sufficient for the raindrop, a distance by which the raindrop moves or travels during the integration time 952 may need to be greater than the size of the raindrop. This is because, for a raindrop to be present or not to be present on a horizontal plane of a detection region, it needs to secure a time from a point in time at which the raindrop enters the horizontal plane of the detection region to a point in time at which the raindrop exits. Thus, the integration time 952 may need to be greater than or equal to 0.5 ms, for example, 5 mm/(10 m/s)=0.5 ms. Thus, the integration time 952, for example, $t_{threshold1}$, for the rainy condition, may be determined by a time length between 0.5 ms and 5 ms, for example, 0.5 ms<$t_{threshold1}$<5 ms. However, the integration time 952 is not limited to the example described in the foregoing. The object detection apparatus may also determine the integration time 952 based on a speed and a size of a type of a particle corresponding to the determined weather condition.

The processor of the object detection apparatus determines, to be the threshold level, a noise floor measured during the integration time 952. For example, as illustrated, the object detection apparatus determines, to be the threshold level, the value $P'_{int\_rain}$ obtained through the integration on the noise floor measured during the integration time 952.

Thus, the object detection apparatus determines that an object is present when a signal power of the object signal $P'_{Peak\_Obj}$ exceeds the threshold level while the object detection apparatus is measuring a target signal 962. Because a noise floor decreases as an integration time increases as illustrated in FIG. 9, the object detection apparatus may thus detect an object more accurately.

Figure 10:
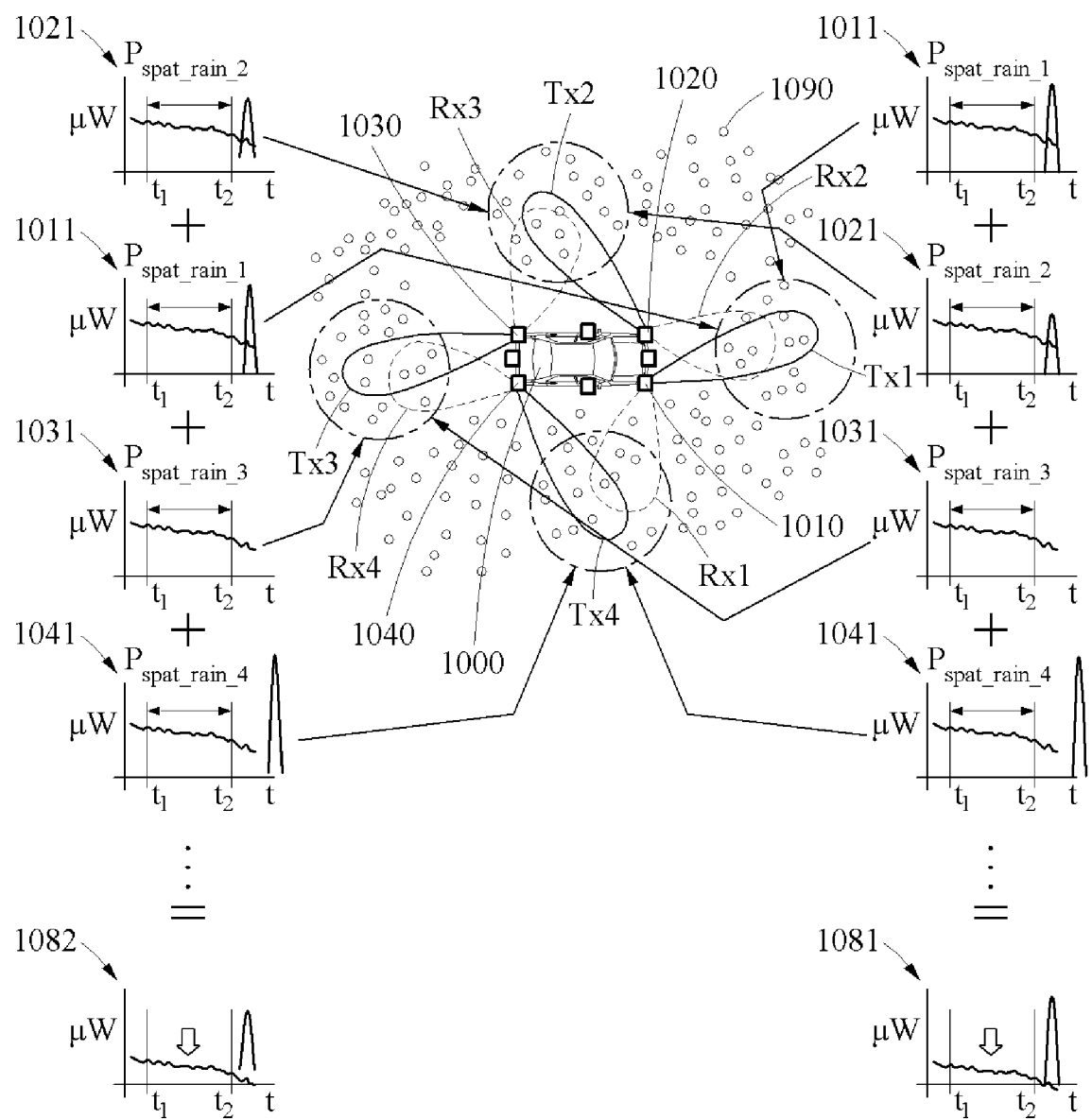
FIG. 10 is a diagram illustrating an example of how an object detection apparatus integrates noise floors measured by radar sensors during an integration time.

FIG. 10 is a diagram illustrating an example of how an object detection apparatus integrates noise floors measured by a plurality of radar sensors during an integration time.

Referring to FIG. 10, when a weather condition is determined to be an inclement condition, a processor of an object detection apparatus 1000 integrates a noise floor measured by at least one radar sensor during an integration time and a noise floor measured by a remaining radar sensor during the integration time.

In an example, the object detection apparatus 1000 may perform a mathematical integration on a noise floor measured by each radar sensor during an integration time. For example, as illustrated, the object detection apparatus 1000 integrates a noise floor 1011 measured by a first radar sensor 1010, a noise floor 1021 measured by a second radar sensor 1020, a noise floor 1031 measured by a third radar sensor 1030, and a noise floor 1041 measured by a fourth radar sensor 1040. Since the detection regions of the respective radar sensors are different from each other, and the object detection apparatus 1000 may randomize a noise floor by integrating the noise floors 1011, 1021, 1031, and 1041. For example, as illustrated, the object detection apparatus 1000 integrates a value $P_{spat\_rain\_1}$ obtained through the mathematical integration on the noise floor 1011 measured by the first radar sensor 1010, a value $P_{spat\_rain\_2}$ obtained through the mathematical integration on the noise floor 1021 measured by the second radar sensor 1020, a value $P_{spat\_rain\_3}$ obtained through the mathematical integration on the noise floor 1031 measured by the third radar sensor 1030, and a value $P_{spat\_rain\_4}$ obtained through the mathematical integration on the noise floor 1041 measured by the fourth radar sensor 1040.

In the example illustrated in FIG. 10, each of four radar sensors may generate one set of sample data of a noise floor, and thus the four radar sensors may generate a total of four sets of sample data. However, examples are not limited to the example described in the foregoing. For example, each radar sensor may emit a transmission signal to two radar sensors, and thus two sets of sample data and a total of eight sets of sample data may be generated.

As illustrated in FIG. 10, a noise floor 1081 obtained through the integrating with respect to the first radar sensor 1010 has a reduced amplitude. A noise floor 1082 obtained through the integrating with respect to the second radar sensor 1020 also has a reduced amplitude. In an example, the object detection apparatus 1000 determines an integrated noise floor to be a threshold level. When a signal power exceeding the threshold level is detected, the object detection apparatus 1000 may determine that an object is present in a corresponding detection region.

Although it is described with reference to FIG. 10 that the object detection apparatus 1000 performs the integrating on all detection regions, examples are not limited thereto. Based on an inclement weather level of an inclement condition, the object detection apparatus 1000 may determine detection regions on which the integrating is performed. In an example, the object detection apparatus 1000 may perform the integrating based on a greater number of detection regions when the inclement weather level increases.

In an example, the object detection apparatus 1000 may enhance accuracy of detecting an object despite a particle 1090 based on a weather condition by performing an operation, such as, for example, adjusting a beam width, adjusting an integration time, and performing spatial integration of noise floors as described with reference to FIGS. 8 through 10.

In an example, in response to the object being detected during object detection, the object detection apparatus 1000 may decrease a size of a detection region in which the object is present. The object detection apparatus 1000 may measure a signal power of a reflected signal by being focused mainly on the object. Thus, the object detection apparatus 1000 may detect the object more accurately.

Figure 11:
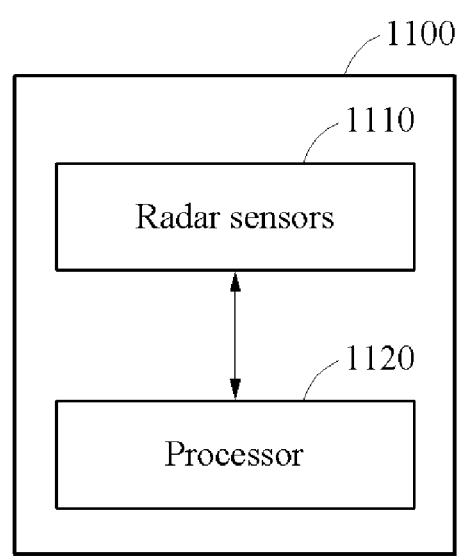
FIGS. 11 and 12 are diagrams illustrating examples of an object detection apparatus.
Figure 12:
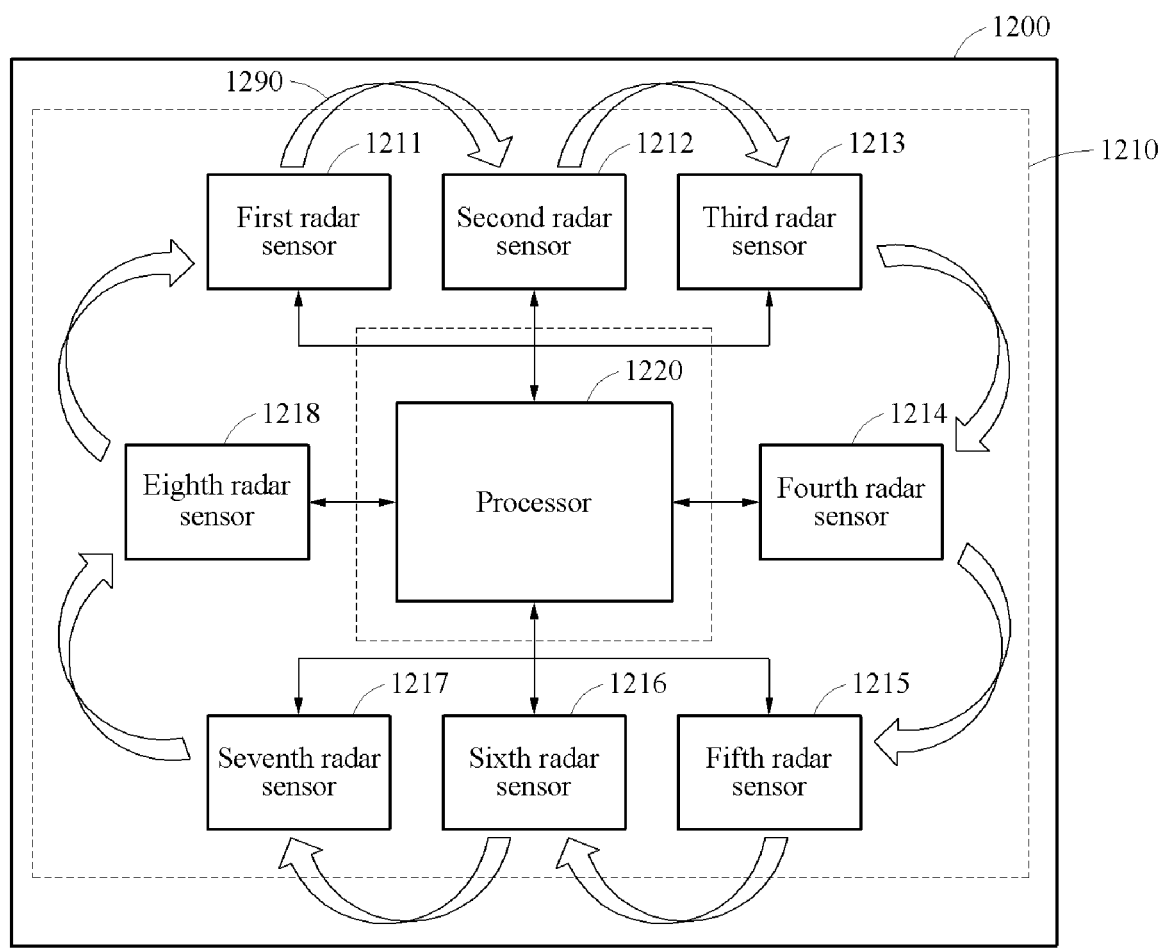

FIGS. 11 and 12 are diagrams illustrating examples of an object detection apparatus.

FIG. 11 is a diagram illustrating a configuration of an object detection apparatus 1100.

Referring to FIG. 11, the object detection apparatus 1100 includes radar sensors 1110 and a processor 1120.

The radar sensors 1110 emit a signal to the outside, or receive a signal from outside. In an example, a radar sensor may exclude receiving a signal emitted by the radar sensor itself. For example, a plurality of radar sensors 1110 may be disposed apart from each other and receive signals radiated from other radar sensors 1110.

The radar sensors 1110 may include, for example, a wide-angle virtual multiple-input and multiple-output (MIMO) antenna array. In an example, the radar sensors 1110 may emit a signal in a form of a phase-modulated continuous wave (PMCW). Each of the radar sensors 1110 may independently operate by emitting and receiving a signal including a code based on a code-division multiple access (CDMA) method. In an example, the radar sensors 1110 may operate based on MIMO technology. The radar sensors 1110 may include the MIMO antenna array. The radar sensors 1110 may form a beam pattern, adjust a beam width, adjust a beam direction, and the like using a plurality of antennas included in the antenna array.

In an example, the processor 1120 determines a weather condition based on a noise floor measured by at least one radar sensor among the radar sensors 1110 for a reference signal emitted from another radar sensor among the radar sensors 1110. In an example, the processor 1120 detects an object based on a result of comparing a threshold level corresponding to the determined weather condition and a signal level of a target signal measured by the at least one radar sensor.

The object detection apparatus 1100 may further include a memory (not shown). The memory may store, temporarily or permanently, information needed to perform an object detection method. For example, the memory may store a noise flow of each radar sensor accumulated during an integration time.

FIG. 12 is a diagram illustrating an example of operations of plural radar sensors included in an object detection apparatus 1200.

Referring to FIG. 12, the object detection apparatus 1200 includes a sensor 1210 and a processor 1220.

The sensor 1210 includes eight radar sensors 1211 through 1218. In an example, a second radar sensor 1212 receives a signal 1290 associated with a first radar sensor 1211, for example, a signal reflected after being emitted by the first radar sensor 1211. A third radar sensor 1213 receives a signal associated with the second radar signal 1212. Remaining radar sensors 1214 through 1218 may operate similarly as described with reference to the second radar sensor 1212 and the third radar sensor 1213.

The processor 1220 processes a signal measured by the radar sensors 1211 through 1218. For example, the processor 1220 integrates noise floors measured by the radar sensors 1211 through 1218 during an integration time. In addition, the processor 1220 determines whether an object is present in a detection region corresponding to each of the radar sensors 1211 through 1218.

The processor 1220 adjusts at least one of a beam direction and a beam width of each radar sensor by controlling the radar sensors 1211 through 1218.

Figure 13:
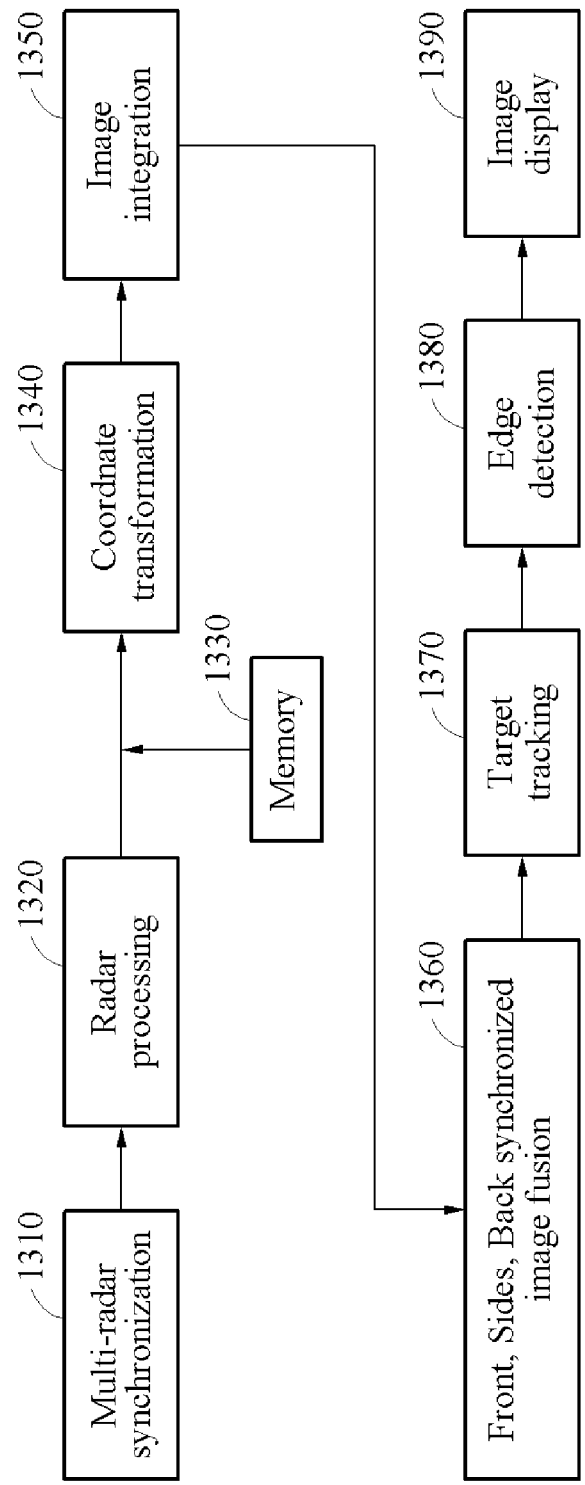
FIG. 13 is a diagram illustrating an example of a radar image processing flow.

FIG. 13 is a diagram illustrating an example of a radar image processing flow.

Referring to FIG. 13, a plurality of radar sensors is synchronized in 1310. The synchronized radar sensors perform general radar processing in 1320. An object detection apparatus performs coordinates transformation 1340 on captured images obtained from the radar sensors using information recorded in a memory 1330, and performs image integration 1350. A radar image processing apparatus fuses captured images corresponding to a front side, lateral sides, and a back side from a vehicle in 1360, and generates a high-resolution image based on the fused image. The radar image processing apparatus tracks a target using the high-resolution image in 1370, detects an edge in 1380, and displays an image 1390.

In an example, the image is displayed on an HUD included in the vehicle. However, the displaying of the image is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the object detection apparatus may be used without departing from the spirit and scope of the illustrative examples described.

The object detection apparatus, object detection apparatus 1100, object detection apparatus 1200, and other apparatuses, units, modules, devices, and other components described herein with respect to FIGS. 11 and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10, and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detection method comprising:
   determining a weather condition based on a noise floor measured by a first radar sensor from among radar sensors arranged separately from one another by adjusting a beam direction of a second radar sensor from among the radar sensors to an elevated direction, in response to a reference signal emitted towards the elevated direction from the second radar sensor and the reference signal received from the elevated direction by the first radar sensor; and
   detecting an object, by adjusting the beam direction of the second radar sensor to a depressed direction, based on comparing a threshold level corresponding to the determined weather condition and a signal level of a target signal measured from the depressed direction by the first radar sensor, the target signal being emitted towards the depressed direction by the second radar,
   wherein the reference signal comprises a signal emitted from the second radar sensor to determine the weather condition based on the noise floor, and the target signal comprises a signal emitted by the second radar sensor and reflected by the object.

2. The object detection method of claim 1, wherein the determining of the weather condition comprises:
   receiving, by the first radar sensor, the reference signal from the elevated direction; and
   emitting, by the second radar sensor, the reference signal towards the elevated direction, and
   the detecting of the object comprises:
   receiving, by the first radar sensor, the target signal from the depressed direction; and
   emitting, by the second radar sensor, the target signal towards the depressed direction.

3. The object detection method of claim 2, wherein the elevated direction corresponds to a direction forming a first angle with a ground surface and the depressed direction corresponds to a direction forming a second angle with the ground surface, and the first angle being greater than the second angle.

4. The object detection method of claim 1, wherein the determining of the weather condition comprises:
   determining the weather condition to be an inclement condition, in response to the noise floor measured for the reference signal exceeding an inclement weather threshold.

5. The object detection method of claim 4, wherein the determining of the weather condition comprises:
   measuring a noise floor of an initial signal emitted from the second radar sensor in an initial condition; and
   determining, to be the inclement weather threshold, a value corresponding to the measured noise floor of the initial signal.

6. The object detection method of claim 1, wherein the determining of the weather condition further comprises:
   measuring a signal level of the reference signal in a narrower detection region, in response to an obstacle being detected in an initial detection region formed by beam patterns of the first radar sensor and the second radar sensor; and
   determining the noise floor of the reference signal by subtracting the signal level of the reference signal measured in the narrower detection region from a signal level of the reference signal measured in the initial detection region.

7. The object detection method of claim 1, wherein the detecting of the object comprises:

determining a noise floor measured in the inclement condition to be the threshold level, in response to the weather condition being determined to be an inclement condition; and determining that the object is present in a detection region formed by beam patterns of the first radar sensor and the second radar sensor, in response to the signal level of the target signal exceeding the threshold level.

8. The object detection method of claim 1, wherein the detecting of the object comprises:

decreasing a beam width of the radar sensors, in response to the weather condition being determined to be an inclement condition.

9. The object detection method of claim 1, wherein the detecting of the object comprises:

increasing an integration time of the radar sensors, in response to the weather condition being determined to be an inclement condition; and determining a noise floor measured during the integration time to be the threshold level.

10. The object detection method of claim 1, wherein the detecting of the object comprises:

integrating, into a noise floor measured by the first radar sensor during the integration time, a noise floor measured by another radar sensor from among radar sensors during the integration time, in response to the weather condition being determined to be an inclement condition; and determining the integrated noise floor to be the threshold level.

11. The object detection method of claim 1, further comprising:

emitting, by the second radar sensor, a signal comprising a preset code; and receiving, by the first radar sensor, the signal comprising the preset code from the second radar sensor, and excluding signals from the other radar sensors.

12. A non-transitory computer-readable storage medium storing instructions that, when executed by a processor, cause the processor to perform the method of claim 1.

13. An object detection apparatus comprising:

radar sensors arranged separately from one another and comprising a first radar sensor configured to receive a signal emitted from a second radar sensor; and a processor configured to:

determine a weather condition based on a noise floor measured by the first radar sensor by adjusting a beam direction of the second radar sensor from among the radar sensors to an elevated direction, in response to a reference signal emitted towards the elevated direction from the second radar sensor and the reference signal received from the elevated direction by the first radar sensor; and detect an object, by adjusting the beam direction of the second radar sensor to a depressed direction, based on comparing a threshold level corresponding to the determined weather condition and a signal level of a target signal measured from the depressed direction by the first radar sensor, the target signal being emitted towards the depressed direction by the second radar, wherein the reference signal comprises a signal emitted from the second radar sensor to determine the weather condition based on the noise floor, and the target signal comprises a signal emitted by the second radar sensor and reflected by the object.

14. The object detection apparatus of claim 13, wherein the first radar sensor is further configured to receive the reference signal from the elevated direction and to receive the target signal from the depressed direction, and the second radar sensor is further configured to emit the reference signal in the elevated direction and to emit the target signal in the depressed direction.

15. The object detection apparatus of claim 13, wherein the processor is further configured to determine the weather condition to be an inclement condition, in response to the noise floor measured for the reference signal exceeding an inclement weather threshold.

16. The object detection apparatus of claim 15, wherein the first radar sensor is further configured to measure a noise floor of an initial signal emitted from the second radar sensor in an initial condition, wherein the processor is further configured to determine a value corresponding to the noise floor of the initial signal to be the inclement weather threshold.

17. The object detection apparatus of claim 13, wherein the first radar sensor is further configured to measure a signal level of the reference signal in a narrower detection region, in response to an obstacle being detected in an initial detection region formed by beam pattern of the first radar sensor and the second radar sensor, wherein the processor is further configured to determine the noise floor of the reference signal by subtracting the signal level of the reference signal measured in the narrower detection region from a signal level of the reference signal measured in the initial detection region.

18. The object detection apparatus of claim 17, wherein the processor is further configured to change the initial detection region to the narrower detection region based on any one or any combination of changing a beam direction of the reference signal, adjusting a beam width of the reference signal, or changing a beam pattern region.

19. The object detection apparatus of claim 13, wherein the processor is further configured to determine a noise floor measured in the inclement condition to be the threshold level, in response to the weather condition being determined to be an inclement condition, wherein the processor is further configured to determine that the object is present in a detection region formed by beam pattern of the first radar sensor and the second radar sensor, in response to the signal level of the target signal exceeding the threshold level.

20. The object detection apparatus of claim 13, wherein the radar sensors are configured to decrease a beam width, in response to the weather condition being determined to be an inclement condition.

21. The object detection apparatus of claim 13, wherein the processor is further configured to increase an integration time of the radar sensors and to determine a noise floor measured during the integration time to be the threshold level, in response to the weather condition being determined to be an inclement condition.

22. The object detection apparatus of claim 13, wherein the processor is further configured to integrate, into a noise floor measured by the first radar sensor during an integration time, a noise floor measured by another radar sensor from among the radar sensors during the integration time, in response to the weather condition being determined to be an inclement condition, and to determine the integrated noise floor to be the threshold level.

23. The object detection apparatus of claim 13, wherein the second radar sensor is further configured to emit a signal comprising a preset code, and the first radar sensor is further configured to receive the signal comprising the preset code from the second radar sensor and to exclude signals from the other radar sensors.

24. The object detection apparatus of claim 13, wherein each of the radar sensors are further configured to receive a reflected signal transmitted from a radar sensor from among the radar sensors, excluding the each radar sensor.

25. The object detection apparatus of claim 13, wherein each of the radar sensors operate sequentially in one or more corresponding time slots, and the each radar sensors are deactivated in another time slot.

26. An apparatus for detecting an object of interest comprising:
   radar sensors arranged at a distance one another;
   a first radar sensor of the radar sensors configured to receive a signal emitted from a second radar sensor of the radar sensors;
   a head-up display (HUD);
   a processor configured to
      determine a weather condition based on a noise floor measured by the first radar sensor by adjusting a beam direction of the second radar sensor from among the radar sensors to an elevated direction, in response to a reference signal emitted from the second radar sensor in an elevated direction and the reference signal received from the elevated direction by the first radar sensor,
      detect an object, by adjusting the beam direction of the second radar sensor to a depressed direction, based on comparing a threshold level corresponding to the determined weather condition and a signal level of a target signal measured from a depressed direction by the first radar sensor, the target signal being emitted by the second radar sensor in the depressed direction, and
      output the object through the HUD.

* * * * *